US009952969B1

United States Patent
Harvey

(10) Patent No.: US 9,952,969 B1
(45) Date of Patent: *Apr. 24, 2018

(54) MANAGING DATA STORAGE

(71) Applicant: EMC Corporation, Hopkinton, MA (US)

(72) Inventor: David W. Harvey, Newton Center, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/827,814

(22) Filed: Mar. 14, 2013

(51) Int. Cl.
G06F 12/08 (2016.01)
G06F 12/02 (2006.01)
G06F 12/0802 (2016.01)

(52) U.S. Cl.
CPC ...... *G06F 12/0802* (2013.01); *G06F 12/0246* (2013.01)

(58) Field of Classification Search
CPC .................... G06F 12/0802; G06F 12/0246
See application file for complete search history.

(56) References Cited

U.S. PATENT DOCUMENTS

| | | | |
|---|---|---|---|
| 2009/0144506 A1* | 6/2009 | Barth et al. .................... 711/129 |
| 2009/0204766 A1* | 8/2009 | Jacobi ................. G06F 12/0804 |
| | | | 711/133 |
| 2009/0210628 A1* | 8/2009 | Gaither ............... G06F 12/0811 |
| | | | 711/134 |
| 2009/0235113 A1* | 9/2009 | Shaeffer .............. G06F 11/1004 |
| | | | 714/5.11 |
| 2011/0055471 A1* | 3/2011 | Thatcher ............... G06F 3/0608 |
| | | | 711/114 |
| 2011/0119569 A1* | 5/2011 | Lee ......................... G11C 16/22 |
| | | | 714/807 |
| 2011/0258391 A1* | 10/2011 | Atkisson et al. ............. 711/118 |
| 2012/0166749 A1* | 6/2012 | Eleftheriou et al. .......... 711/165 |
| 2012/0297140 A1* | 11/2012 | Wu et al. ....................... 711/133 |
| 2013/0031298 A1* | 1/2013 | Tan ..................... G06F 12/0246 |
| | | | 711/103 |

* cited by examiner

*Primary Examiner* — Mano Padmanabhan
*Assistant Examiner* — William E. Baughman
(74) *Attorney, Agent, or Firm* — Krishnendu Gupta; Jason A. Reyes

(57) ABSTRACT

There are disclosed techniques for use in managing data storage in a data storage system which comprise a data storage device and a cache memory. In one example, a method comprises the following steps. An I/O request is received and a durability requirement of the I/O request data associated with the I/O request is determined. Based on the durability requirement of the I/O request data, the I/O request data is classified. The classified I/O request data is stored in the cache memory.

3 Claims, 4 Drawing Sheets

MANAGING DATA STORAGE

TECHNICAL FIELD

This application relates to managing data storage, and more particularly to managing data storage in a data storage system that comprises a data storage device and a cache memory.

BACKGROUND OF THE INVENTION

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with a write operation, the data storage system may utilize a variety of different techniques such as write-back caching. With write-back caching, the data storage system may temporarily cache data received from a host within its storage cache and de-stage the cached data at different times onto the physical disk drives. As known in the art, the cache used in the data storage system may be implemented using a fast, volatile memory, such as RAM (random access memory).

It should be noted that a data storage system may include multiple storage processors storing data to a same set of storage devices. Each of the storage processors may have its own cache so that cached data for the write operations, as well as possibly other cached data, may be mirrored in the caches of the storage processors. Multiple storage processors may be desirable for use in providing fault tolerance, higher throughput, and the like.

In general, a storage system may use read cache to increase the speed of transactions between the storage processor and disk storage and increase the overall speed of the system. Typically, data is transferred from disk to read cache in pages or blocks of data. The data transferred typically includes data requested by the host system and optionally additional data, sometimes known as pre-fetched data, which is determined to be data that is most likely to be requested by the host system soon.

Usually the total size of the data on disk is significantly larger than amount of cache memory available in the system so that the cache eventually becomes full. As a result, the system must decide which pages in the cache are to be removed and which are maintained.

Due to the temporal locality of cache accesses, most pages that were accessed in the recent past are very likely to be accessed again the near future. Thus, systems typically use a least recently used (LRU) memory management process, where the page least recently accessed is removed from the cache.

SUMMARY OF THE INVENTION

There is disclosed a computer-implemented method for use in managing data storage in a data storage system, wherein the data storage system comprises a data storage device and a cache memory, the method comprising: receiving an I/O request; determining a durability requirement of the I/O request data associated with the I/O request; based on the durability requirement of the I/O request data, classifying the I/O request data; and storing the classified I/O request data in the cache memory.

There is also disclosed a data storage system, comprising: a cache memory; a data storage device; and a control circuit coupled to the cache memory and the data storage device, the control circuit being constructed and arranged to: receive an I/O request; determine a durability requirement of the I/O request data associated with the I/O request; based on the durability requirement of the I/O request data, classify the I/O request data; and store the classified I/O request data in the cache memory.

There is further disclosed a computer program product having a non-transitory computer readable storage medium which stores code for use in managing data storage in a data storage system, wherein the data storage system comprises a data storage device and a cache memory, the code including instructions to: receive an I/O request; determine a durability requirement of the I/O request data associated with the I/O request; based on the durability requirement of the I/O request data, classify the I/O request data; and store the classified I/O request data in the cache memory.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Figure 1:
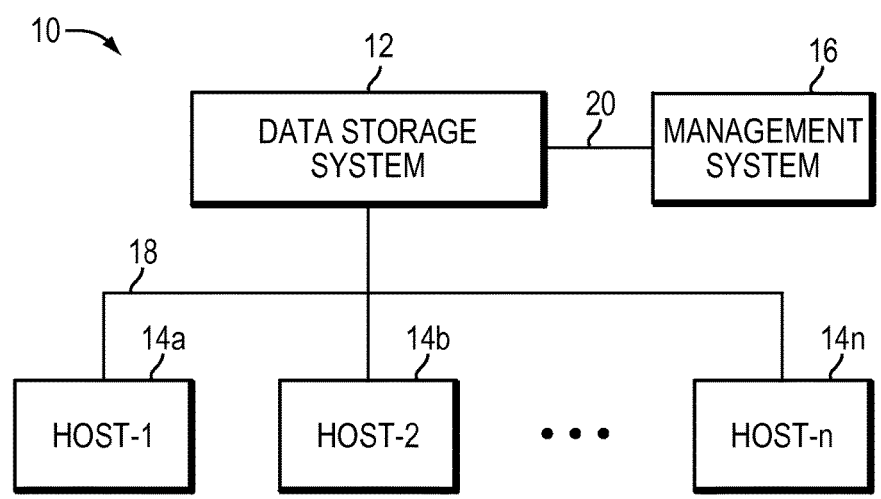
FIG. 1 is an example of an embodiment of a computer system that may utilize the techniques described herein.

Referring to FIG. 1, there is illustrated an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20 and/or at least partially included in the one or more data storage systems 12. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, at least part of the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein.

Figure 2:
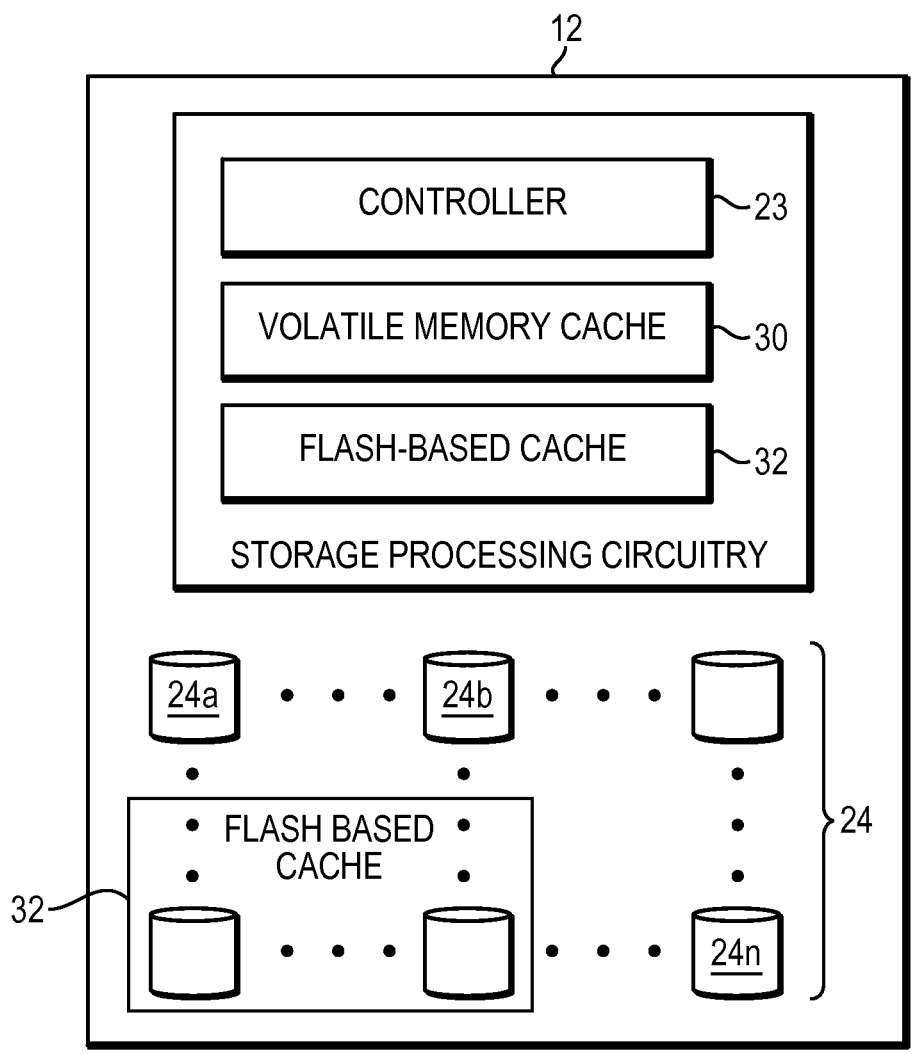
FIG. 2 is a diagram illustrating in more detail components of the system of FIG. 1 that may be used in connection with the techniques described herein.

Referring to FIG. 2, there is illustrated a more detailed representation of components that may be included in an embodiment using the techniques herein. In the example, a data storage system 12 may include disks 24 accessed by logical volumes as described above. The data storage system 12 may also include controller 23, a volatile memory cache 30 and a flash-based cache 32. It should be appreciated that the volatile memory cache 30 may be faster and smaller and more expensive than the flash-based cache 32. As described in more detail below, one or more of the disks 24 may be, include, or be included in a flash-based disk, and cache 32 may include such flash-based disk.

The volatile memory (VM) storage cache 30 can include any one or more different types of volatile memory, such as RAM. The flash-based cache 32 is a flash-based memory or solid state drive (SSD) which is non-volatile to store data persistently. The data storage system 12 may utilize a write-back caching technique in which data for a write request is first written to VM cache 30. The VM cache 30 is used to designate some portion of VM used as a write cache although there may be other VM included in the data storage system for other purposes. During normal operation, data from the VM cache 30 may be stored to a portion of the flash-based cache 32, and the data may be de-staged at a later point from the flash-based cache 32 to disk.

The controller 23 may be configured to perform data storage operations on behalf of the hosts of FIG. 1 during normal operation using the volatile memory storage cache 30, the flash-based cache 32, and the disks 24. As described above during normal operation, when a host sends a request to write data to the data storage system, the controller 23 stores the data of the write request in the VM cache 30. Also, the controller may be configured to perform, for example, as a background process, to copy data from the VM cache to a portion of the flash-based cache 32. At some point later, the data may be destaged or written out to the disks 24 from the flash-based cache 32.

As will be appreciated by those skilled in the art, the data storage system 12 may also include other components than as described for purposes of illustrating the techniques herein.

Figure 3:
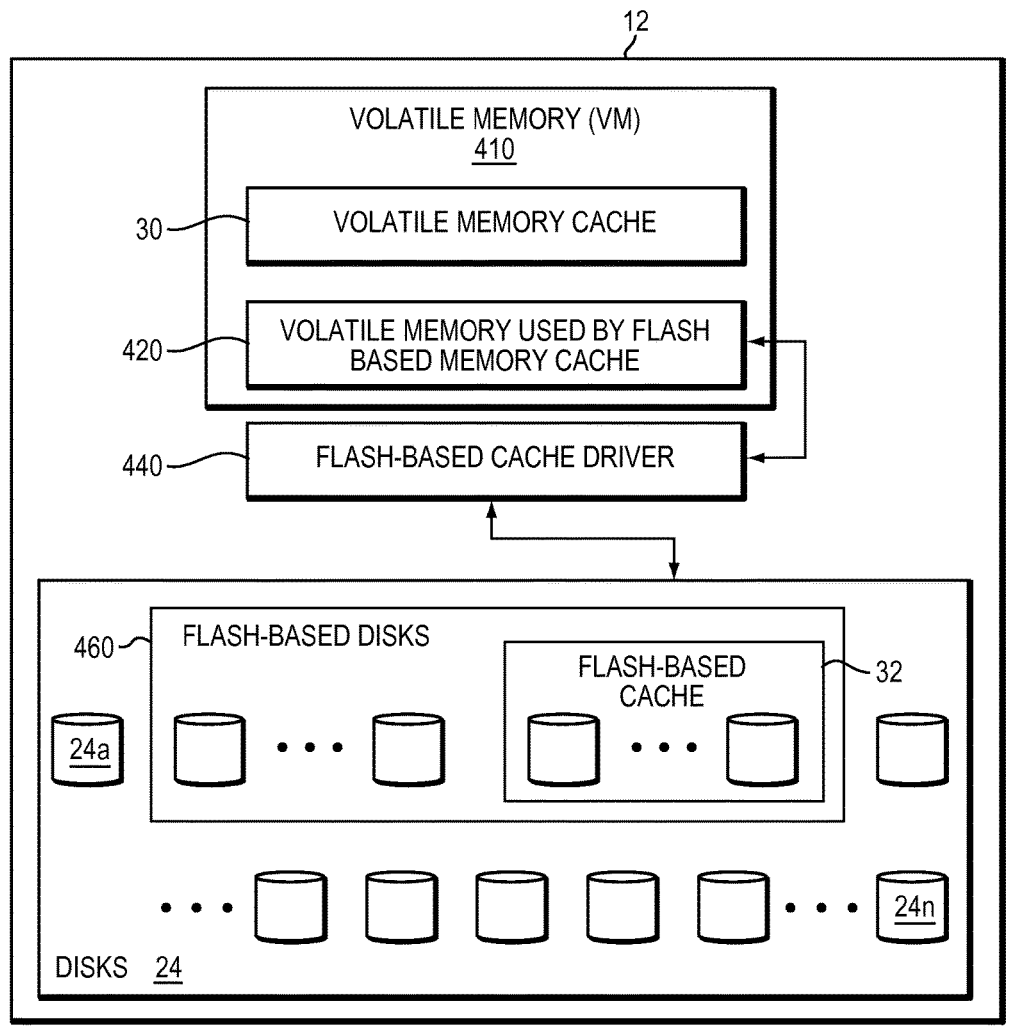
FIG. 3 is another diagram illustrating in more detail components of the system of FIG. 1 that may be used in connection with the techniques described herein.

Referring to FIG. 3, there is illustrated an example of one configuration of the VM cache 30 and flash-based cache 32 that may be used in an embodiment with the techniques herein. System 12 has volatile memory (VM) 410 that includes cache 30, and VM portion 420 which is used by flash-based cache 32. Disks 24 include flash-based disks 460. System 12 has a flash-based cache driver 440 that helps control cache 32 using VM portion 420.

In one embodiment, the cache 32 is created by using at least a subset of flash-based disks 460 that would otherwise be used the same way that the rest of disks 24 are used for user data. Since the number of disks in cache 32 can be large, e.g., 100 disks, and therefore cache 32 can be large in size, VM portion 420 may need to be large as well to support such a size of cache 32.

Flash based cache 32 and its driver 440 require, in the form of VM portion 420, some amount of what would normally be part of VM cache 30 in order to maintain its internal state, e.g., for metadata for cache management, including lookup tables specifying where, if possible, requested data can be found in cache 32, and data usage counters and related information to help determine which data should be present in cache 32.

Figure 4:
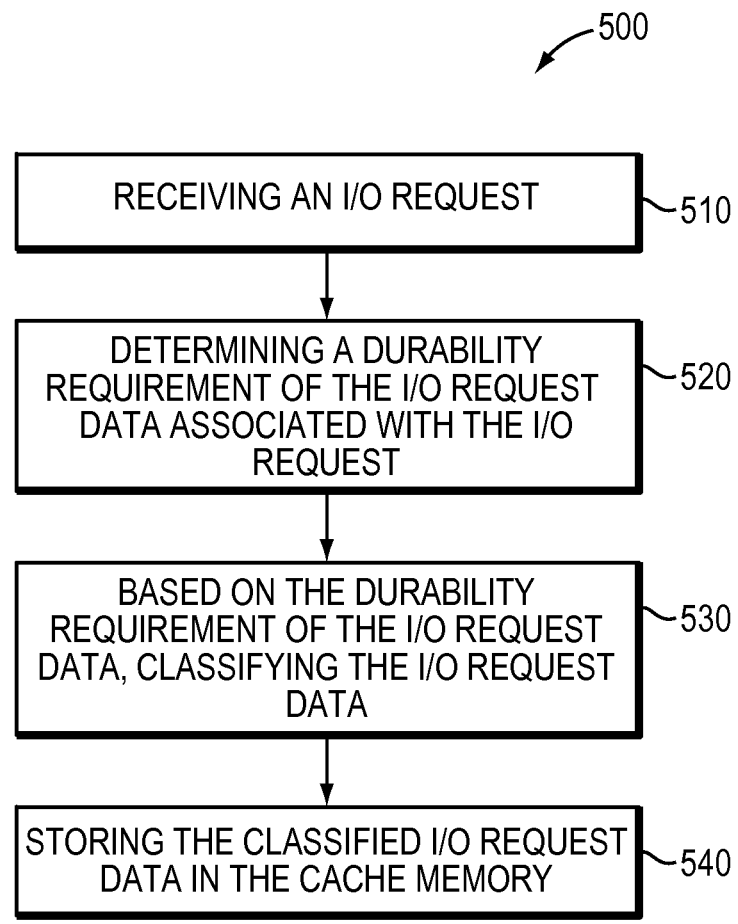
FIG. 4 is a flow chart illustrating a method that may be used in connection with techniques described herein.

Referring to FIG. 4, there is illustrated a flow chart of a method 500 that may be used in connection with techniques described herein. The exemplary method 500 can be used for managing data storage in a data storage system 12 that comprises data storage devices and a cache memory. In this embodiment, the data storage devices can be the disks 24 and the cache memory can be the flash-based cache 32. In the flow diagram, the operations are summarized in individual blocks. The operations may be performed in hardware, or as processor-executable instructions that may be executed by a processor. Furthermore, the method 500 may, but need not necessarily, be implemented using the data storage system of FIG. 1.

At step 510, the method receives an I/O request. For example, the I/O request can be issued by one of the hosts 14 to the data storage system 12. It should be understood that the I/O request can be a write request comprising the content data, the logical block address at which the data is to be stored, etc. Alternatively, the I/O request can be a read request to read data stored in the data storage system. For example, the data may be stored in at least one of the disks 24. Consequently, the read request can comprise the logical block address at which the data is stored, etc. It should also be understood that the data associated with the read request may also be located in the cache 32 enabling the data storage system 12 in at least some embodiments to return the data to the host 14 from cache 32 more quickly.

At step 520, the method determines a durability requirement of the I/O request data associated with the I/O request. It should be understood that durability can relate to the non-recoverable read rate of data. In at least some embodiments, as will be described elsewhere herein, the durability requirements can relate to the non-recoverable read rate of data from the cache 32. Essentially, in these embodiments, the durability requirement relates to the expectation that the I/O request data will be returned from cache 32. For example, the standard storage devices provide data durability in the range of 1 in 10^13 to 10^15 unrecoverable read errors per bit read. However, a read caching application would be completely acceptable with unrecoverable read errors per bit read range as low as 1 to 10^9 or 10^11.

In this particular case, the step of determining 520 the durability requirement of the I/O request data is dependent on the I/O request data being stored in the disks 24. For example, in one embodiment, the durability requirement of the I/O request data is dependent on the I/O request data being stored persistently in the disks 24. Consequently, it should be appreciated that the durability requirement of data associated with a write I/O request can be greater than the durability requirement of data associated with a read I/O request. In other words, data that is associated with a write request that has not been written to disks 24 will have a greater durability requirement than a read request for data already stored in the disks 24. Accordingly, if the data is newly written data that has not be persistently stored in disks 24 then the durability requirements will be at the upper end of the durability requirements. Conversely, if the data is persistently stored in disks then the durability requirements will be less.

At step 530, the method classifies the I/O request data based on the durability requirement of the I/O request data. For example, if a write I/O request is received to write new data to the disks 24 then the new data will be classified as high durability data. If a read I/O request is received to read data from the disks 24 then the read data will be classified as low durability data.

At step 540, the method stores the classified I/O request data in the cache 32. It should be appreciated that in at least one embodiment the data with high durability will be stored in the cache 32. It should also be appreciated from the foregoing that data with a low durability requirement can also be stored in cache 32. It should be further appreciated that if the cache 32 is full it can make room for new data by discarding the low durability data in the cache 32. The cache 32 is made aware of the durability requirements of the data by the flash cache driver 440 specifying a single bit on communications with the cache 32 to indicate the durability requirement of the data. For example, a single bit can be specified on each write to the cache 32 indicating high or low durability. The fact that the cache 32 is aware of the durability enables the cache 32 to discard the low durability data at any time. It should be appreciated that if a read for discarded data is received subsequent to discarding the data then the cache 32 may return an error. In this case, the data will be simply read from disks 24. In the event of the cache being full, the cache can also de-stage some of the dirty data in the cache 32 to disks 24. Once the dirty data is de-staged to disks 24 then this data can be re-classified as low durability data and discarded if required.

In use, if the host 14 issues a write request with new data then this data will be written to the VM cache 30 which can be a write cache utilizing write-back caching techniques. Once the host 14 is acknowledge using these techniques, the data is determined to be of high durability requirements and is moved to flash-based cache 32. It should be appreciated that the data is determined to be high durability data as it is not yet stored in disks. As mentioned above, the flash cache driver 440 can specify a single bit on each write to indicate the durability requirements. Subsequently, if the host 14 requests the data from the data storage system 12 then it can be returned from the flash-based cache 32 more quickly than it would if stored in disks 24. Additionally, if at a later stage the data is de-staged to disks 24 then the data may be in both flash-based cache 32 and disks 24 in which case the durability requirement will be lower as the data is now stored persistently in disks 24. The flash cache driver can assist in the re-classification of the data.

Furthermore, in use, if the host 14 issues a read request to the data storage system 12 to read data stored only in disks 24 then the data can be copied into the flash-based cache 32 and returned to the host 14. During the copying into cache 32, the data will be determined to be of low durability requirements and stored as low durability data in cache 32.

As will be appreciated from the foregoing, the flash-based cache 32 is configured to store in the flash-based cache 32 both extremely durable data that is the only copy of the data and also less durable data that is a copy of data stored elsewhere. It should also be appreciated that the flash-based cache 32 may discard the lower durability data at arbitrary times thereafter. The data will be considered the lowest ranked data below the higher ranked data. However, it should also be appreciated that statistically a large amount of data can be returned from the cache 32 resulting in improved performance of the disks 24.

It should also be appreciated that the flash cache driver 440 can be aware of the number of blocks in cache 32 with a high durability attribute. The flash cache driver 440 can ensure that the number of blocks with such an attribute never exceeds a high durability capacity. A lower durability capacity of the cache may vary over time and the fast cache driver can also attempt not to exceed that capacity.

It should be appreciated from the foregoing that informing the flash devices of the durability requirement for the data presents significant advantages. The flash drives can use this information to provide, in addition to the highly durable storage that they normally provide, additional storage of potentially reduced durability at fundamentally no additional cost.

While the above description describes that the cache 32 can be created by using a subset of flash-based disks 460, the cache 32 can also be created by using at least a portion of the over-provisioned portion of the flash-based disks 460. It should be understood that the flash devices can be significantly over-provisioned due to the unit of erasure in the flash device being larger than the size that is typically written thereto. The exposed logical capacity of the flash drives can be significantly smaller than the currently available raw capacity. In some cases, the flash devices are over-provisioned by as much as thirty or forty percent. In addition, deduplication and compression techniques may reduce the amount of capacity used. As a result, unused capacity may be used for lower durability storage (i.e., read data).

For flash drives to be generally useful, its logical capacity must be a constant size, and it must return all data that is written to it. A flash drive might have a block with 128 pages of data that all must be erased at one time in order for the data in any of those pages to be overwritten. The number of times that a block may be erased is limited. If there is little free space on a drive, then each write of a single page will require reorganization of data requiring re-write of the other 127 pages in a block, degrading performance and the device's lifetime. To alleviate this difficulty the drives are over-provisioning to ensure there is enough free space to avoid such wear and performance degradation.

The technique as described with respect to FIG. 4 can allow writes to cache be classified by the desired degree of durability, allowing the additional over-provisioned capacity to be consumed by data with a lower durability requirement (e.g., for a read cache), without significantly affecting the reasons for the over-provisioning or the higher durability data. The flash-based cache may discard the lower durability data at arbitrary times, but statistically, a large amount of data can be returned from flash-based cache.

It will be appreciated that an embodiment may implement the technique herein using code executed by a computer processor. For example, an embodiment may implement the technique herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method, comprising:
storing data in a flash-based cache of a data storage system, wherein the flash-based cache comprises at least a portion of over-provisioned flash storage of a flash storage device;
ranking the data in the flash-based cache in accordance with data durability of the data, wherein the data durability describes an unrecoverable read error rate in connection with the data such that data stored in more than one place in the data storage system will have a different unrecoverable read error rate relative to data stored in the flash-based cache only;
based on the ranking, determining data to discard from the flash-based cache such that data with one of a higher or lower unrecoverable read error rate is discarded before data with the other of the higher or lower unrecoverable read error rate; and
discarding the determined data from the flash-based cache.

2. A data storage system, comprising:
a cache memory; and
a control circuit coupled to the cache memory, the control circuit being constructed and arranged to:
store data in a flash-based cache of a data storage system, wherein the flash-based cache comprises at least a portion of over-provisioned flash storage of a flash storage device;
rank the data in the flash-based cache in accordance with data durability of the data, wherein the data durability describes an unrecoverable read error rate in connection with the data such that data stored in more than one place in the data storage system will have a different unrecoverable read error rate relative to data stored in the flash-based cache only;
based on the ranking, determine data to discard from the flash-based cache such that data with one of a higher or lower unrecoverable read error rate is discarded before data with the other of the higher or lower unrecoverable read error rate; and
discard the determined data from the flash-based cache.

3. A computer program product having a non-transitory computer readable storage medium which stores code, the code including instructions to:
store data in a flash-based cache of a data storage system, wherein the flash-based cache comprises at least a portion of over-provisioned flash storage of a flash storage device;
rank the data in the flash-based cache in accordance with data durability of the data, wherein the data durability describes an unrecoverable read error rate in connection with the data such that data stored in more than one place in the data storage system will have a different unrecoverable read error rate relative to data stored in the flash-based cache only;
based on the ranking, determine data to discard from the flash-based cache such that data with one of a higher or lower unrecoverable read error rate is discarded before data with the other of the higher or lower unrecoverable read error rate; and
discard the determined data from the flash-based cache.

* * * * *